United States Patent [19]
Moriue et al.

[11] Patent Number: 5,357,525
[45] Date of Patent: Oct. 18, 1994

[54] MULTIPLEX TRANSMISSION SYSTEM

[75] Inventors: Hiroo Moriue; Yutaka Matsuda; Kyosuke Hashimoto; Kiyoshi Inoue, all of Hiratsuka; Seiji Hirano; Osamu Michihira, both of Hiroshima; Yoshikazu Nobutoki, Higashihiroshima; Hiroaki Sakamoto, Fukuyama, all of Japan

[73] Assignees: The Furukawa Electric Co., Ltd., Tokyo; Mazda Motor Corp., Hiroshima, both of Japan

[21] Appl. No.: 860,897

[22] Filed: Mar. 31, 1992

[30] Foreign Application Priority Data

Apr. 2, 1991 [JP] Japan .................................. 3-070029
Aug. 23, 1991 [JP] Japan .................................. 3-211761

[51] Int. Cl.$^5$ .......................... G08C 25/02; H04L 1/18
[52] U.S. Cl. ...................................... 371/32; 370/85.1
[58] Field of Search ...................... 371/32, 33, 30, 48; 370/85.1, 13

[56] References Cited

U.S. PATENT DOCUMENTS

| | | | |
|---|---|---|---|
| 4,558,428 | 12/1985 | Matsumura et al. | 364/900 |
| 4,914,654 | 4/1990 | Matsuda et al. | 370/94.1 |
| 4,939,725 | 7/1990 | Matsuda et al. | 370/85.3 |
| 4,951,281 | 8/1990 | Muto et al. | 370/95.2 |
| 5,251,211 | 10/1993 | Mutoh et al. | 370/85.1 |

FOREIGN PATENT DOCUMENTS

| | | |
|---|---|---|
| 0286383 | 10/1988 | European Pat. Off. . |
| 0399491A2 | 11/1990 | European Pat. Off. . |
| 2627039 | 8/1989 | France . |
| 2013452 | 8/1979 | United Kingdom . |

OTHER PUBLICATIONS

Patent Abstracts of Japan, vol. 15, No. 209 (E-1072) May 28, 1991 & JP-A-03 057,398 (Fujitsu) Mar. 12, 1991.

Primary Examiner—Robert W. Beausoliel, Jr.
Assistant Examiner—Phung M. Chung
Attorney, Agent, or Firm—Frishauf, Holtz, Goodman & Woodward

[57] ABSTRACT

A multiplex transmission system of this invention includes a plurality of multiplex nodes interconnected by a common multiplex transmission line. A frame of data is transmitted among the multiplex nodes through the multiplex transmission line. When a data frame transmitted from an air conditioner switch multiplex node (subnode) is received, an air conditioner unit multiplex node (main node), which is predetermined as a destination node, detects the contents of each data from an ID-a of the received data, performs a calculation on SOM to DATA 4 received, generates collation data (CRC) in accordance with the result of the calculation and transmits same. The subnode generates collation data (CRC), which is an error check code, through a calculation on the transmitted SOM to DATA 4, and compares the thus-generated CRC with the CRC received from the main node, to determine whether or not the data transmission was properly carried out. When the data transmission was carried out properly, the subnode returns a signal ACK3, and when the data transmission failed, the data frame is retransmitted, whereby the subnode need not have an ACK management function.

5 Claims, 12 Drawing Sheets

| SOM | PRI | ID | CONT. | DATA1 | DATA2 | DATA3 | DATA4 | CRC | EOD | ACK SIGNAL AREA | EOM |

MULTIPLEX TRANSMISSION SYSTEM

BACKGROUND OF THE INVENTION

1. Field of the Invention

This invention relates to a multiplex transmission system for carrying out a data transmission among a plurality of multiplex nodes connected to a common multiplex transmission line, and more particularly, to a multiplex transmission system using CSMA/CD (carrier sense multiple access/collision detection).

2. Description of the Related Art

In conventional multiplex transmission systems of this type, a plurality of terminals (multiplex nodes) are connected to a common multiplex transmission line (multiplex bus) formed of, e.g., a paired cable. One of the multiplex nodes sends a predetermined data frame to the multiplex bus in accordance with the CSMA/CD method, to thereby transmit data simultaneously to the other multiplex nodes. The data frame includes an acknowledge signal (ACK signal) area at an end thereof.

In such systems, it is known that each of the multiplex nodes that received the data frame returns an ACK signal to a bit position of the ACK signal area preassigned thereto.

Each multiplex node has a communication control device (LSI), a control circuit (CPU), which is a computer for communication, and an input/output interface (I/F) circuit.

The CPU fetches data indicating events from various switches and the like through the I/F circuit connected thereto, and the LSI (large-scale integrated circuit) of each multiplex node operates independently of those in the other multiplex nodes. The LSI includes a transmission buffer memory for storing message data supplied from the CPU and a data ID identifying this data, and is able to send the data frame of this message to the multiplex bus at desired timing. Therefore, a collision of transmitted messages can occur on the multiplex bus, and conventionally this is prevented by setting a priority sequence for the transmission of individual messages.

In accordance with the priority sequence thus set, each LSI carries out a priority control to send a message without destroying same. Specifically, the LSI carries out a data transmission according to a nondestructive arbitration type CSMA/CD access method in which the transmission of a message with a lower priority is automatically interrupted and only the higher-priority message is continuously transmitted. When the data is properly received, each multiplex node returns an ACK signal to a location of address uniquely assigned thereto (the respective bit area in the ACK signal area).

If a local error occurs in the network and the data received by a multiplex node is erroneous, then no ACK signal is returned from this multiplex node, and therefore, the sending multiplex node determines that an abnormal situation occurred, and retransmits the data. The sending multiplex node repeats the transmission of the data, e.g., three times at the maximum, until all of the registered multiplex nodes return the ACK signals. In prior art systems, all nodes have the function of determining whether or not the ACK signals have been returned from the nodes and retransmitting data. To achieve this function, each node has a 24-bit memory, for example, and all of the nodes connected to the multiplex bus are registered in this memory.

A sending multiplex node uses an ACK management function, i.e., if a node fails to return the ACK signal even though the data transmission was repeated three times, such a node is regarded as being in trouble and is excluded from the registration in the memory, and when an extra ACK signal is received, the node corresponding to this ACK signal is registered.

In a multiplex node in which data supplied thereto has changed due to a change of events, the CPU writes transmission data in the transmission buffer memory of the LSI and generates a send request, and upon receiving the send request, the LSI starts to send the transmission data. After the transmission by the LSI is completed and the transmission buffer memory becomes empty, the CPU can write next transmission data. In some multiplex nodes, if the need to transmit new data arises before the transmission is not yet completed, the request to send the data already written in the transmission buffer memory is canceled, to allow the new data to be written therein.

In the multiplex transmission system described above, all of the nodes in the network have the ACK management function, and therefore, a large-scale communication control circuit must be used. Further, each multiplex node must determine the reception states of the nodes including not only the destination node but the other nodes, and accordingly, the occupation time of the multiplex bus is prolonged and the manufacturing cost of the system is increased.

Furthermore, in this multiplex transmission system, when the data loaded into the transmission buffer memory is in a stand-by state, up-to-date data cannot be transmitted unless the transmission of the data in the transmission buffer memory is ended, even through an event change has occurred. Accordingly, the transmission of up-to-date data having greater importance is delayed.

In the above multiplex transmission system, moreover, when the request to send the data stored in the transmission buffer memory is canceled, the stored data is lost. Therefore, to retain such data, an additional buffer memory must be provided for the queue, which entails an increase of the manufacturing cost.

SUMMARY OF THE INVENTION

This invention was contrived in view of the above circumstances, and an object thereof is to provide a multiplex transmission system which can be reduced in scale by providing in a network at least one multiplex node capable of an ACK management of the entire network and thereby making it unnecessary for the LSIs in the other multiplex nodes to carry out the ACK management.

Another object of this invention is to provide a multiplex transmission system in which each of the multiplex nodes detects only the reception state of the destination node, whereby the occupation time of a multiplex bus is shortened.

Still another object of this invention is to provide a multiplex transmission system capable of instantly transmitting up-to-date data having greater importance.

The above objects can be achieved by a multiplex transmission system of this invention, which has a plurality of multiplex nodes interconnected by a common multiplex transmission line for transmitting a frame of data among the multiplex nodes through the multiplex transmission line, wherein, when data transmitted from a predetermined one of the multiplex nodes is received, a principal one of the multiplex nodes which is predetermined as a destination node generates predetermined collation data in accordance with the received data and transmits same, and the predetermined multiplex node generates predetermined collation data in accordance with the data transmitted therefrom, and compares the thus-generated collation data with the collation data transmitted from the principal multiplex node, to determine whether or not a transmission of the data was properly carried out, in accordance with a result of the comparison.

In the multiplex transmission system according to this invention, the predetermined multiplex node determines the success/failure of the data transmission, by comparing the collation data generated thereby in accordance with the transmission data with the collation data generated by the destination principal multiplex node in accordance with the transmission data. Accordingly, the LSI of the predetermined multiplex node has only to determine the reception state of a destination node, and thus need not have the ACK management function for registering and managing all multiplex nodes connected to the multiplex bus.

The above and other objects, features, and advantages of this invention will become more apparent from the ensuing detailed description taken in conjunction with the accompanying drawings.

DESCRIPTION OF THE PREFERRED EMBODIMENTS

Figure 1:
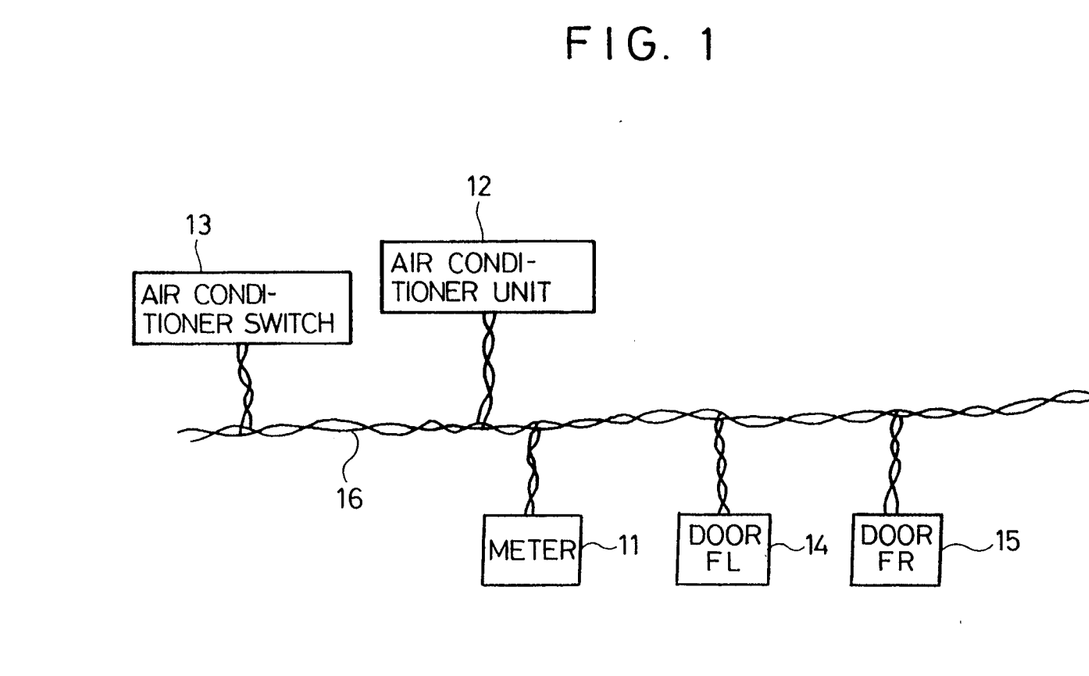
FIG. 1 a diagram showing the arrangement of an automobile multiplex transmission system using a nondestructive arbitration type CSMA/CD method, according to this invention.

Referring to FIG. 1, a multiplex transmission system is installed in an automotive vehicle utilizing a nondestructive arbitration type CSMA/CD access system. The multiplex transmission system comprises a plurality of multiplex nodes which include, e.g., a meter multiplex node 11, an air conditioner unit multiplex node 12 for controlling the air conditioner in the automobile, an air conditioner switch multiplex node 13 for controlling the switches of an air conditioner, a door FL (front-left) multiplex node 14, and a door FR (front-right) multiplex node 15; and a multiplex bus 16 formed, e.g., of a shielded twisted pair cable. These multiplex nodes 11 to 15 are interconnected by the multiplex bus 16 to constitute a network. In this network, signals representing vehicle drive conditions are transmitted serially in units of data frames in a multiplex mode.

Of these multiplex nodes, the air conditioner switch multiplex node 13 does not have a calculation function or a discrimination or determination function and is used only to carry out a communication with the air conditioner unit multiplex node 12. Yet the air conditioner switch multiplex node 13 has the function of transmitting switch status signals to the air conditioner unit multiplex node 12 and turning on LEDs, not shown, in accordance with a signal supplied from the air conditioner unit multiplex node 12, and therefore, is a subnode subordinate to the air conditioner unit multiplex node (main node) 12.

Figure 2:
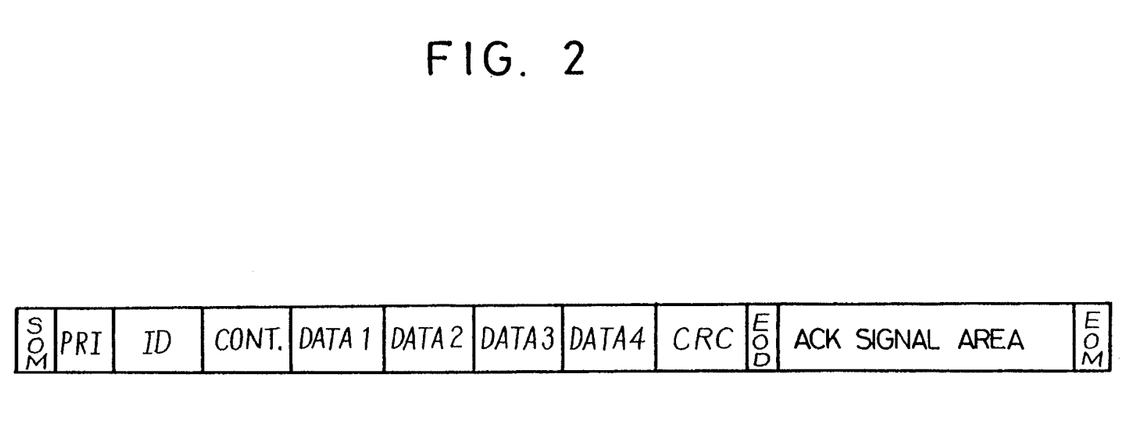
FIG. 2 is a diagram showing an example of a message format for a data frame.

As shown in FIG. 2, a data frame transmitted in this network has a message format usually employed in the multiplex transmission system. Namely, the data frame includes an SOM (start-of-message) indicating the start of the message, a priority (PRI) used for determining the priority sequence when a plurality of multiplex nodes simultaneously send data, a message ID representing the contents of subsequent data (DATA), a control data area (CONT) including data representing the data length, data areas (DATA 1 to DATA 4) having a length (variable length) specified by the CONT, an error check code such as a CRC (cyclic redundancy check code), an EOD (end-of-data) indicating the end of the data, an ACK signal area to which ACK signals are returned from all multiplex nodes on a bit-wise basis, and an EOM (end-of-message) indicating the end of the message.

Each of the multiplex nodes 11 to 15 is assigned a unique address. Namely, when data is properly received, the multiplex nodes 11 to 15 return ACK signals to respective bit areas in the ACK signal area corresponding to addresses 1 to 5 respectively uniquely assigned thereto. For example, the meter multiplex node 11 returns an ACK signal to ACK 1, the air conditioner unit multiplex node 12 returns an ACK signal to ACK 2, the air conditioner switch multiplex node 13 returns an ACK signal to ACK 3, the door FL multiplex node 14 returns an ACK signal to ACK 4, and the door FR multiplex node 15 returns an ACK signal to ACK 5.

Figure 3:
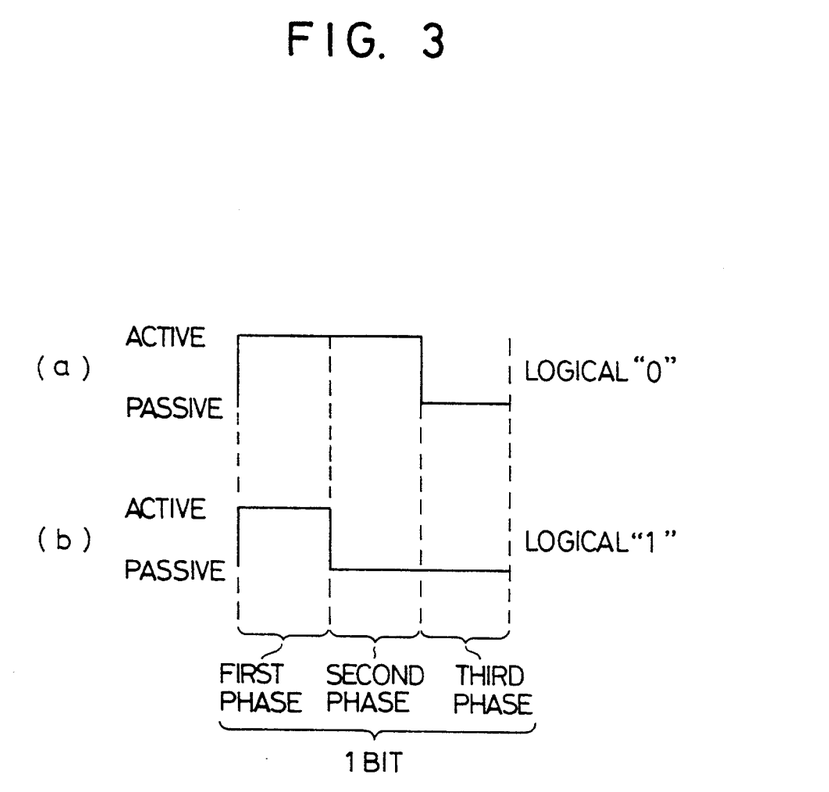
FIG. 3 is a diagram showing the structure of a PWM signal used for a transmission code in the multiplex transmission system.

The ACK signal area may be constituted by any desired transmission code. An example is shown in FIG. 3, in which a PWM (pulse-width modulated) signal is used in order to facilitate the return and reception of the ACK signal by each multiplex node.

In the illustrated PWM signal, one logical bit is divided into three bit segments (hereinafter referred to as "phases"). First and third phases of the PWM signal have fixed levels, i.e., they have active and passive levels, respectively, and a second phase may have an active or passive level. Namely, when the second phase of the PWM signal is active, then it means logical "0," and when the second phase is passive, it indicates logical "1."

Accordingly, a sending multiplex node, which is the source of transmission of a data frame, sends onto the multiplex bus an active signal at the first phase of each bit in the ACK signal area. When the data frame is properly received, each of the other receiving multiplex nodes detects the leading edge of the first phase of the bit assigned thereto, and at the same time renders the multiplex bus active and maintains the active state up to the second phase, so that the bit concerned Indicates logical "0." On the other hand, when the data is improperly received, each of the receiving nodes does not set the multiplex bus active, though it detected the leading edge of the first phase of the bit assigned thereto, and therefore, the second phase becomes passive, which indicates logical "1."

By way of example, a data transmission between the air conditioner unit multiplex node 12 and the air conditioner switch multiplex node 13 in the multiplex transmission system will be described.

Figure 4:
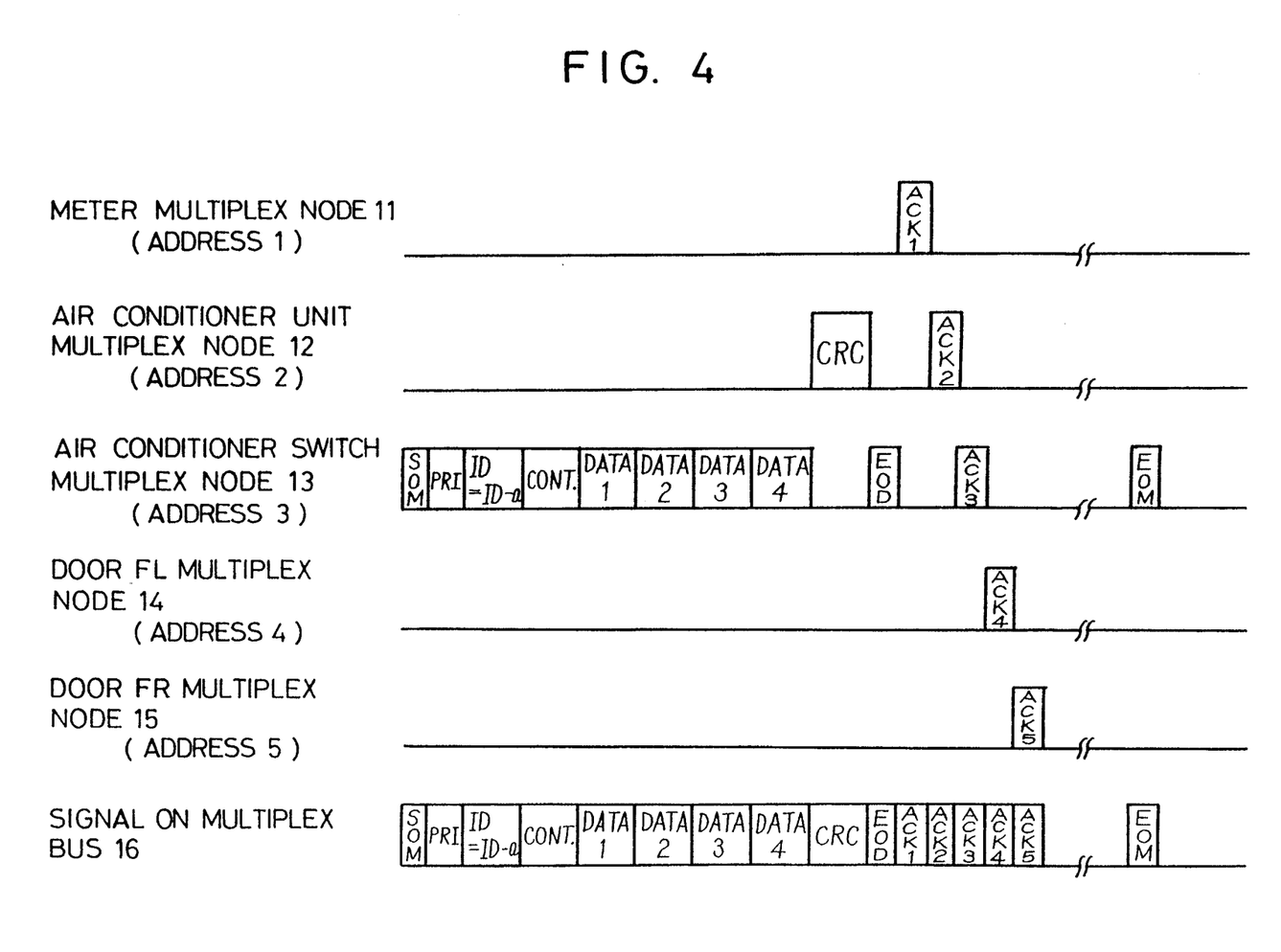
FIG. 4 is a chart showing the data frame at different stages, for illustrating a transmission procedure of the multiplex transmission system according to a first embodiment of this invention.

As shown in FIG. 4, first the air conditioner switch multiplex node (subnode) 13 transmits a frame composed of the SOM, PRI, ID, CONT, and DATA 1 to DATA 4 to the air conditioner unit multiplex node (main node) 12 through the multiplex bus 16. The subnode 13 derives a CRC, which is an error check code, through a calculation on the SOM to DATA 4 transmitted.

The main node 12 detects the contents of each data from the ID-a of the received frame, derives a CRC through a calculation on the SOM to DATA 4 received, and transmits the CRC to the subnode 13.

Upon receiving the CRC from the main node 12, the subnode 13 compares the received CRC with the CRC calculated thereby. When these CRCs coincide, the subnode 13 returns an ACK signal ACK3 to the main node 12, and the data transmission is ended. When the CRCs do not coincide, the subnode 13 does not return the signal ACK3, and the subnode 13 retransmits the frame.

In this case, the transmission code used in the data transmission comprises a PWM signal, as shown in FIG. 3, like the transmission code for the ACK signal area. Accordingly, the subnode 13 transmits an active signal at the first phase, and the main node 12 transmits data at least at the second phase in a manner timed with the first phase, whereby the main and subnodes 12 and 13 can be easily synchronized.

When the signal ACK3 is received, the main node 12 determines that the data transmission was carried out properly, and thus ends the data transmission. the signal ACK3 is not received at predetermined reception timing, then the main node 12 waits for a retransmission of the frame from the subnode 13.

In the data transmission described above, the main node 12 can determine whether or not the data from the subnode 13 was properly received by the other multiplex nodes 11, 14 and 15, by detecting the ACK signals. Although the subnode 13 cannot determine whether or not the other multiplex nodes 11, 14 and 15 have properly received the data, no problems arise because the destination of the data transmission from the subnode 13 is the main node 12 only.

In the above case, the multiplex nodes 11, 14 and 15 are not required to return the ACK signals, and therefore, the frame may be constructed such that it ends with the EOD, where the ID is ID-a. Further, the CRC is derived through a calculation on the SOM to DATA 4, but this invention is not limited to this calculation method. For example, the CRC may be derived through a calculation on the PRI to DATA 4.

As described above, in the multiplex transmission system of this invention, the subnode is not required to perform the ACK management of the entire network, and accordingly, the LSI may be small in scale because it need not have the ACK management function. Furthermore, the main node determines only the reception state of the destination node, and thus the occupation time of the multiplex bus can be shortened.

A procedure for the communication between the main and subnodes 12 and 13 according to a second embodiment of this invention will be now described. The message format of a data frame transmitted in the network is identical with that shown in FIG. 2.

Figure 5:
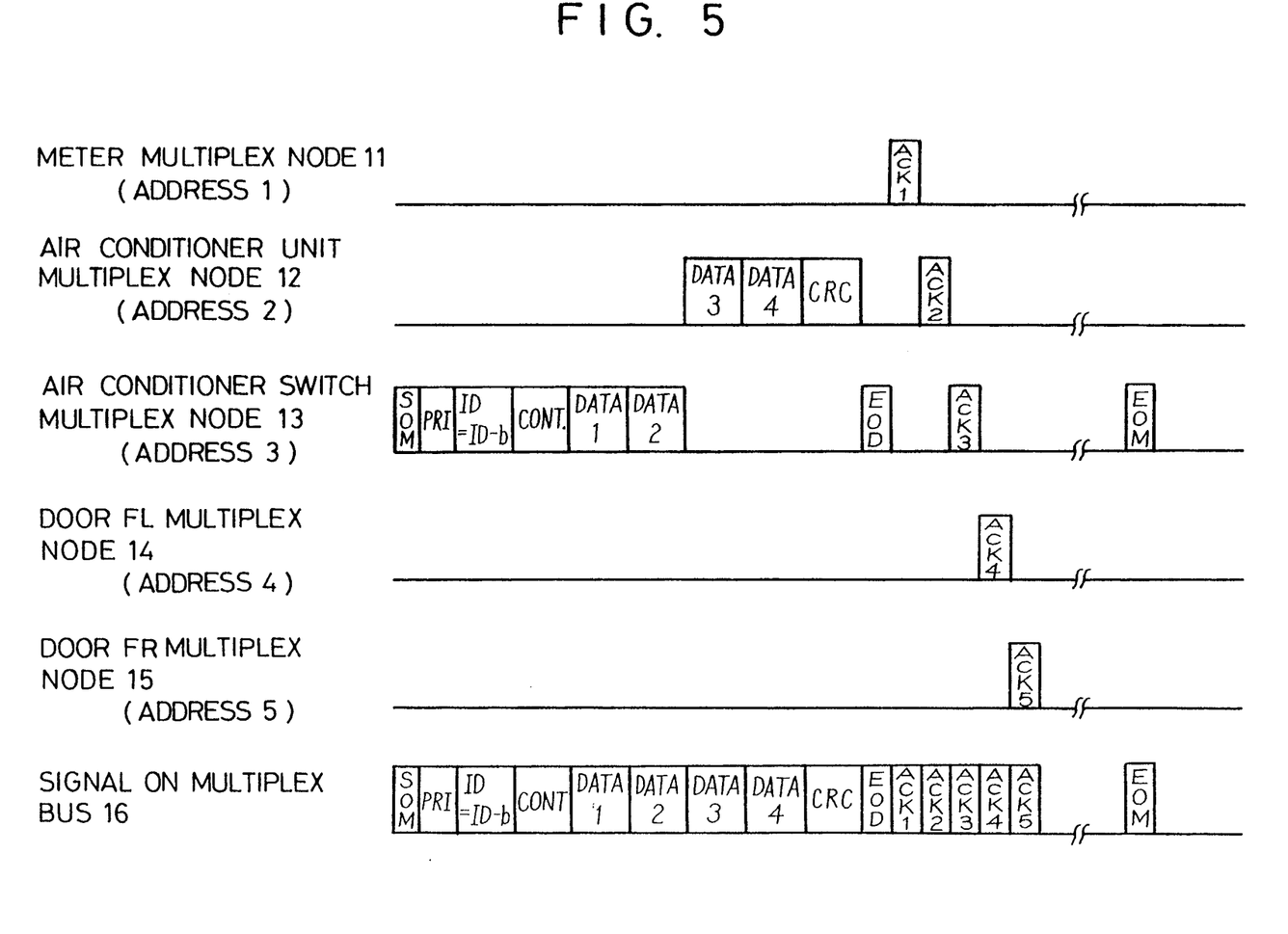
FIG. 5 is a chart showing the data frame at different stages, for illustrating a transmission procedure of the multiplex transmission system according to a second embodiment of this invention.

As shown in FIG. 5, the subnode 13 transmits a frame consisting of SOM, PRI, ID, CONT, DATA 1 and DATA 2 through the multiplex bus 16.

The main node 12 detects the contents of each data from the ID-b of the frame, performs a calculation on the SOM to DATA 2 received and DATA 3 and DATA 4 to be transmitted therefrom, and transmits a CRC obtained by the calculation and the DATA 3 and DATA 4.

Upon receiving the DATA 3, DATA 4 and CRC from the main node 12, the subnode 13 performs a calculation on the SOM to DATA 2 transmitted therefrom and the received DATA 3 and DATA 4, to obtain a CRC. Then, the subnode 13 compares the thus-obtained CRC with the CRC received from the main node 12, and if these CRCs coincide, it returns an ACK signal ACK3 to the main node, and the data transmission is ended. If the CRCs do not coincide. the subnode 13 does not return the signal ACK3 but retransmits the frame to the main node 12.

Also in this case, a PWM signal is used for the transmission code, as in the first embodiment shown in FIG. 4, and therefore, it is very easy to achieve a synchronization between the main and subnodes 12 and 13.

When the signal ACK3 is received, the main node 12 determines that the data transmission was carried out properly, and thus ends the data transmission. Where the signal ACK3 is not received at the predetermined timing, the main node 12 waits for a retransmission of the frame from the subnode 13.

In the second embodiment described above, DATA 1 and DATA 2 are transmitted from the subnode 13 and DATA 3 and DATA 4 are transmitted from the main node 12. However, this invention is not limited to such a data transmission procedure, and the transmission procedure may be set such that DATA 1 is transmitted from the subnode 13 and DATA 2 to DATA 4 are transmitted from the main node 12.

Now, another example of the message format for a data frame transmitted in the network will be described.

Figure 6:
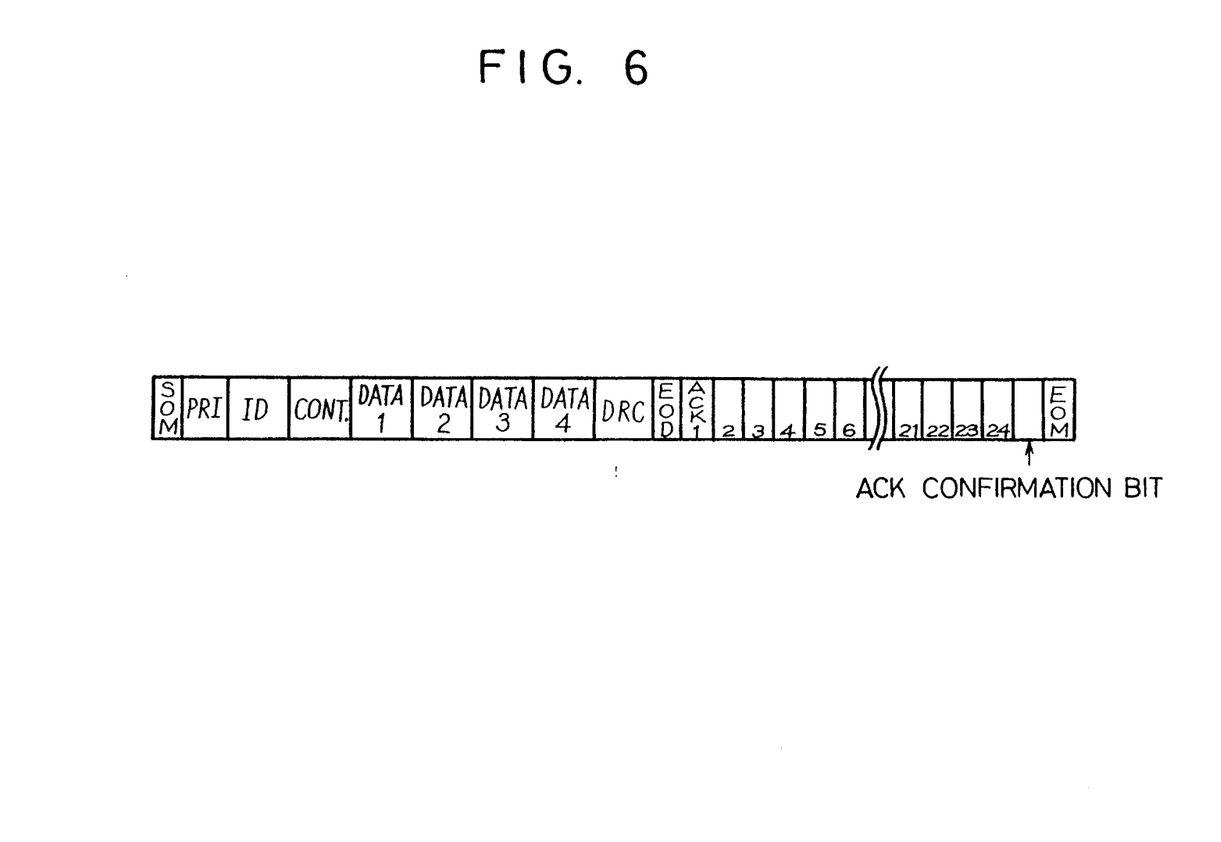
FIG. 6 is a diagram showing another example of the message format for a data frame according to this invention.

The message format shown in FIG. 6 is almost identical to that shown in FIG. 2, but differs therefrom in that a one-bit ACK confirmation area, which is used to indicate that ACK signals are returned from all registered nodes and thus the data transmission is completed, is provided following the ACK signal area.

Figure 7:
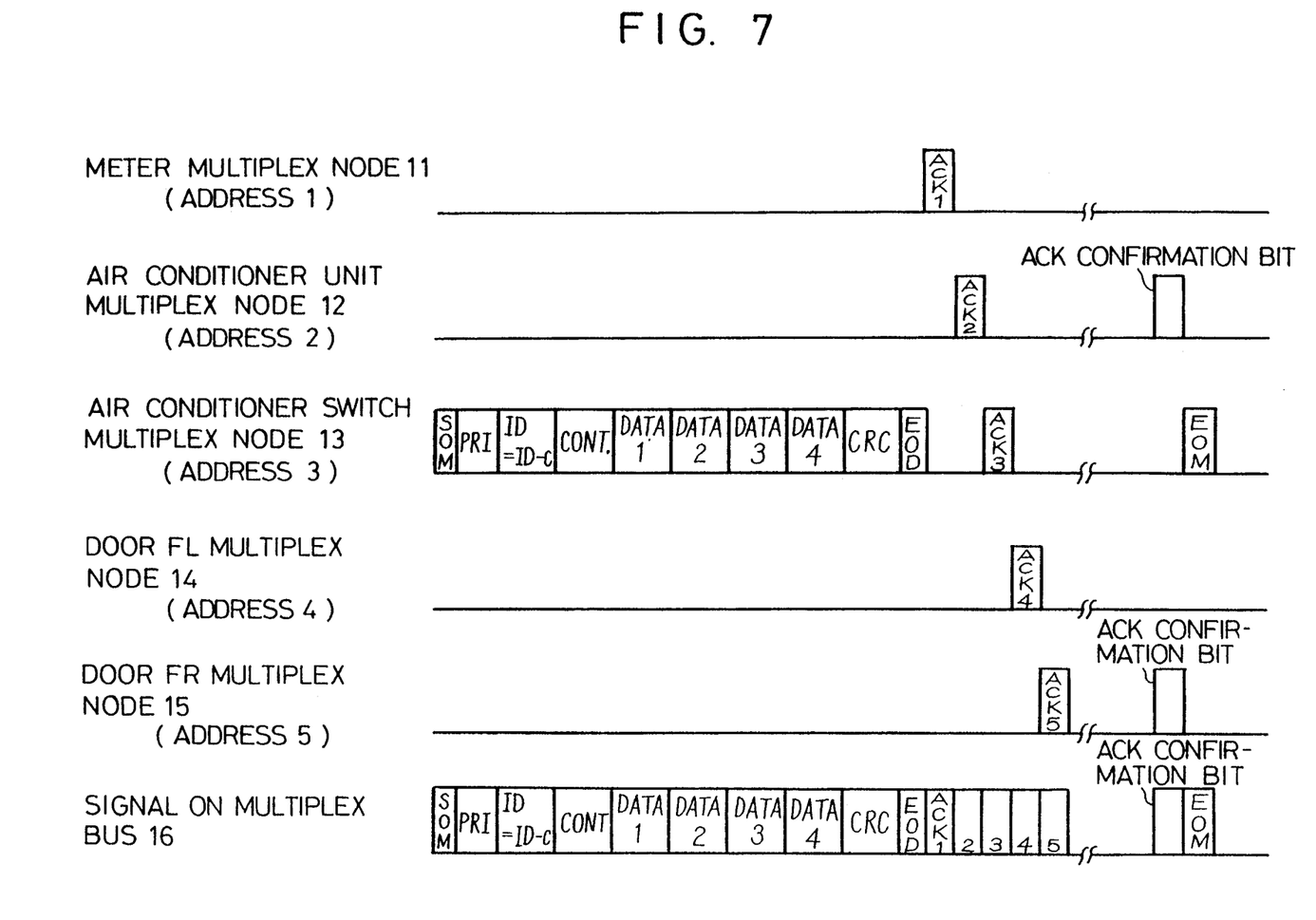
FIG. 7 is a chart showing the data frame at different stages, for illustrating a transmission procedure of the multiplex transmission system according to a third embodiment of this invention.

FIG. 7 shows the data frame at various stages when it is transmitted in accordance with a transmission procedure of a third embodiment of this invention. In this embodiment, the data frame shown in FIG. 6 is transmitted between the air conditioner unit multiplex node 12, which is a principal node capable of the ACK management, and the air conditioner switch multiplex node 13, which is an input/output node not having the ACK management function. It should be noted that, in this embodiment, the air conditioner switch multiplex node 13 need not be a subnode subordinate to the air conditioner unit multiplex node 12, and it is here assumed that the node 13 is capable of communicating with the air conditioner unit multiplex node 12, as well as with the other multiplex nodes. Further, the door FR multiplex node 15 also is a principal node having the ACK management function, like the air conditioner unit multiplex node 12.

As shown in FIG. 7, the input/output node 13 transmits a data frame including SOM through EOD to the principal node 12 via the multiplex bus 16. Each of the nodes returns an ACK signal to the ACK signal area specified by the data frame.

Upon determining that all of the registered nodes returned ACK signals (in this embodiment, ACK1 to ACK5 from the nodes 11 to 15) by the ACK management function, the principal node 12 sends a predetermined signal (ACK confirmation bit) to the ACK confirmation area in the frame.

The input/output node 13 determines whether or not the data transmission was properly carried out, by checking the ACK confirmation area.

Accordingly, when the predetermined signal exists in the ACK confirmation area, the input/output node 13 determines that the data was properly transmitted, and thus ends the data transmission. If the predetermined signal does not exist in the ACK confirmation area, the input/output node 13 retransmits the data frame consisting of SOM through EOD to the principal node 12, and again determines whether or not the data transmission was properly effected, by detecting the presence/absence of the predetermined signal in the ACK confirmation area.

In this embodiment, the door FR multiplex node 15 also can transmit the predetermined signal to the ACK confirmation area. Further, the meter multiplex node 11 and the door FL multiplex node 14 each can determine whether or not a data transmission was properly carried out, by detecting the presence/absence of the predetermined signal in the ACK confirmation area.

In the above embodiment, two principal nodes are provided, but this invention is not limited to such a configuration. Namely, the multiplex transmission can be executed as far as at least one principal node exists in one network. Further, this invention may be applied to a negative acknowledge system in which a predetermined signal is sent to the ACK confirmation area when all of the registered nodes do not return the ACK signals. In this case, however, if all of the principal nodes become defective, the ACK management function is not available, and therefore, the data is not retransmitted even though a transmission error occurred. By using the affirmative system, as in this embodiment, it is possible to ensure a reliable operation of the system because the ACK confirmation bit is not returned to the ACK confirmation area if all of the principal nodes are in trouble, and thus the data is retransmitted without fail.

Further, the third embodiment is described with reference only to a communication between a principal multiplex node having the ACK management function and an input/output node not having the ACK management function. Since in the third embodiment, the input/output node need not be a subnode subordinate to a principal node, a communication between input/output nodes is feasible in principle.

For example, when transmitting a signal from the door FL multiplex node, which is an input/output node, to the air conditioner SW multiplex node, which also is an input/output node, the door FL multiplex node sets the predetermined value of the ID in the message format shown in FIG. 6 to an ID value for transmission and sends it to the communication control section, whereas the air conditioner SW multiplex node sets a corresponding ID to be received. Alternatively, an identifier indicating a communication between input/output nodes is inserted in the CONT area of the message format. The input/output node which is to receive the frame is then set in a state ready for the reception of the frame by means of pin setting, for example, whereby a communication between input/output modes is carried out.

The frame having the predetermined ID value is transmitted from the door FL multiplex node, and if all of the multiplex nodes in the network properly receive the frame, ACK signals are returned from all multiplex nodes connected to the multiplex transmission line. Upon detecting the ACK signals, the principal multiplex node sends a predetermined signal to the ACK confirmation area, whereby a data transmission between input/output nodes can be carried out, like the data transmission between a principal multiplex node and an input/output node or between principal multiplex nodes.

Furthermore, although the foregoing three embodiments are described with reference to a multiplex transmission system in which a one-bit ACK signal is returned from each of the receiving nodes when data is properly received, the application of this invention is not limited to this multiplex transmission system. Namely, this invention can be applied to a multiplex transmission system wherein the node addresses are coded by a specific multiplex node, the ACK signal area is divided in accordance with the coded addresses, and when a message is properly received, the multiplex nodes each return an ACK signal to a location of the ACK signal area specified by the coded address.

In this case, the subnode or input/output node need not determine whether or not the ACK signal is returned from each of the nodes, and therefore, need not have the ACK management function, whereby the manufacturing cost of the multiplex transmission system can be reduced. The main node, on the other hand, itself carries out the ACK management when transmitting data, and accordingly, the multiplex transmission system of this invention can determine whether or not ACK signals are returned from all nodes, and thus whether or not a data retransmission is required.

The arrangement of a communication control device used in the multiplex transmission system of this invention will be now described.

Figure 8:
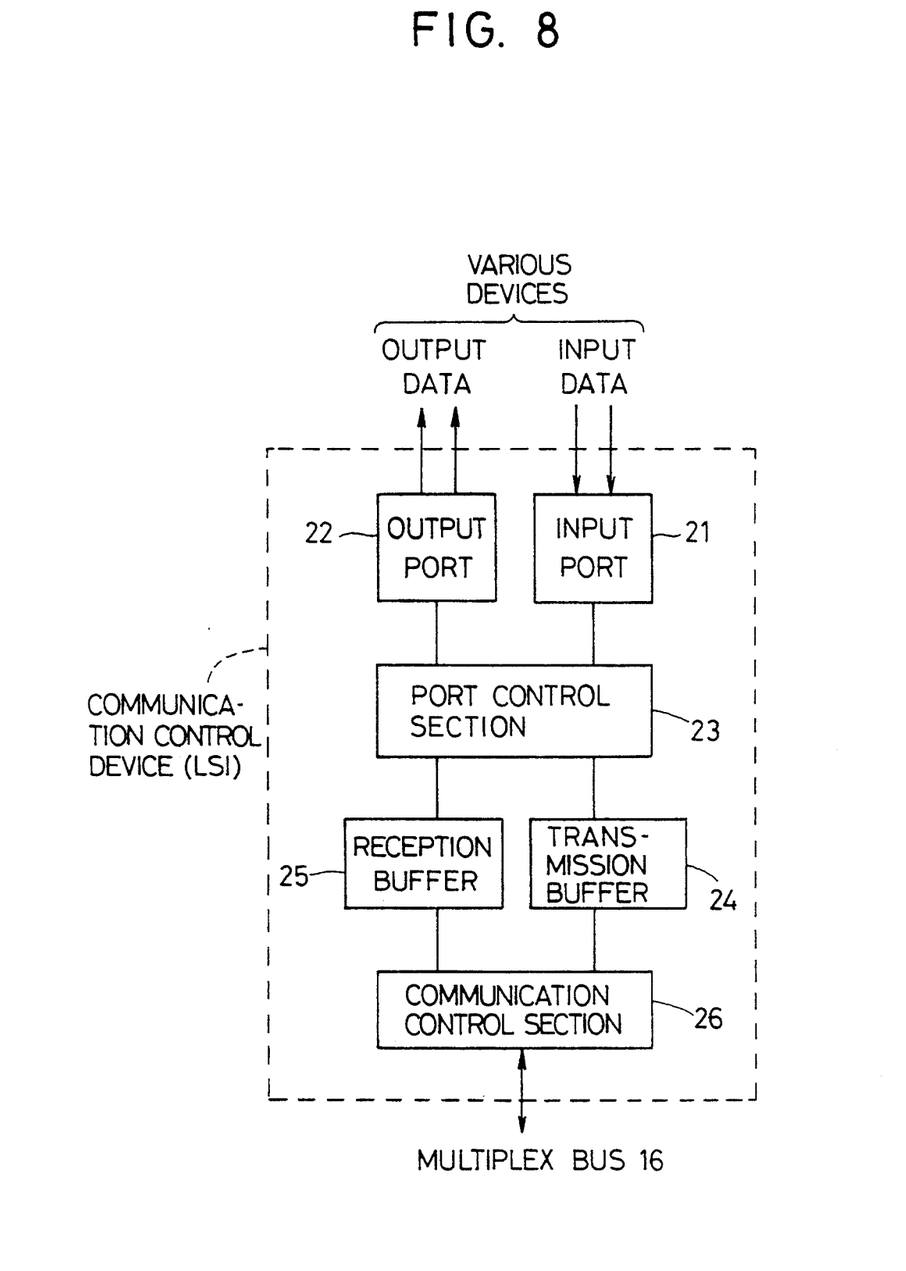
FIG. 8 is a schematic diagram showing the arrangement of a communication control device according to this invention.

Referring to FIG. 8, the communication control device comprises a simple multiplex node including no CPU and not having the ACK management function. The communication control device includes an input port 21 through which data from various devices connected thereto (e.g., switches) is input in the form of parallel signals, an output port 22 from which data is output to the various devices, a port control section 23 for controlling the input/output of data, a transmission buffer memory 24 for storing data to be transmitted, a reception buffer memory 25 for storing the data received, and a communication control section 26.

Figure 9:
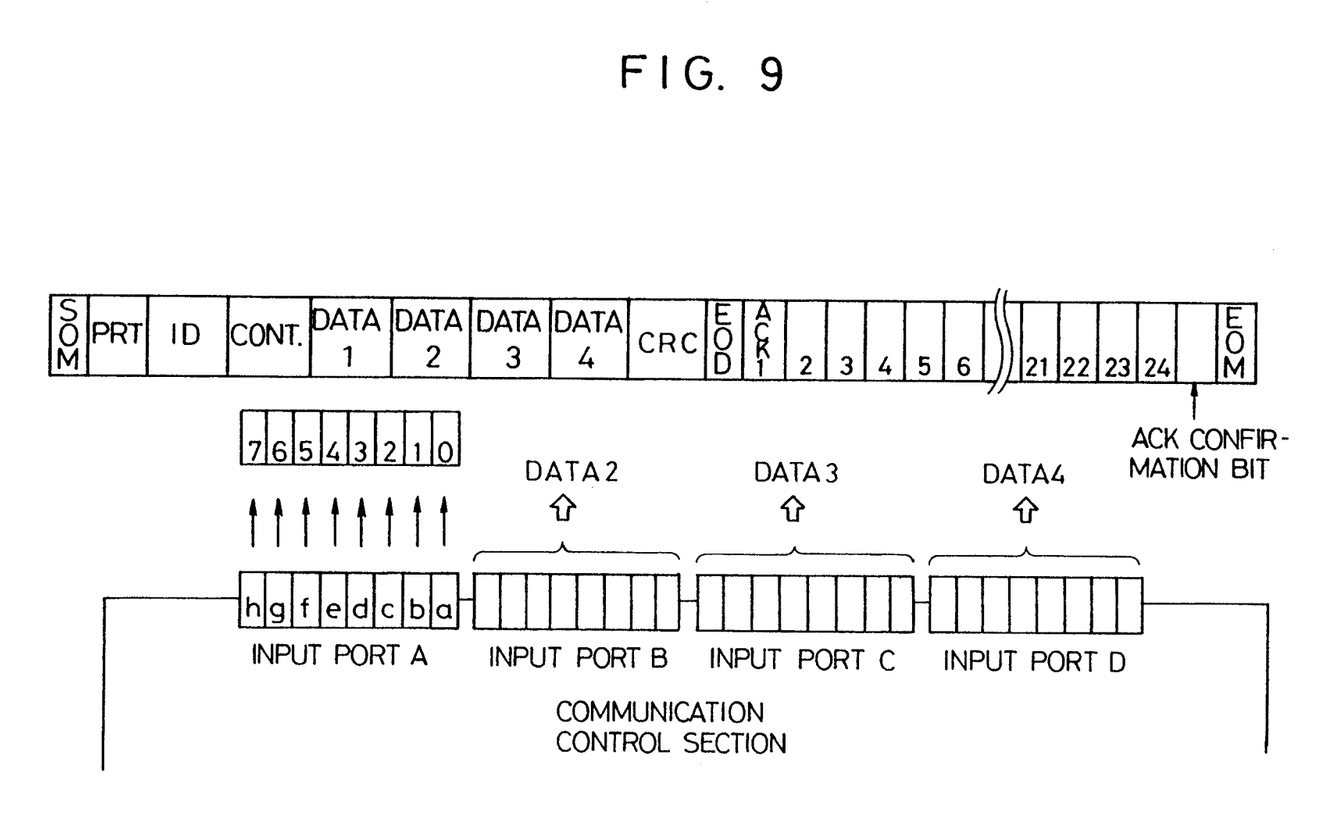
FIG. 9 is a diagram showing the contents of a transmission frame output from the communication control device shown in FIG, 8.

The multiplex node of this embodiment has only one kind of transmission ID, and the transmission frame has a structure as shown in FIG. 9. Namely, the transmission ID is data identifying a multiplex node from which the frame is transmitted, and the data area is composed of, e.g., a plurality of one-bit areas 0 to 7 corresponding to the individual ports of the input port (e.g., ports a–h of the input port A). In this embodiment, when any one of data items input to the individual ports of the input port is subjected to change, the data of all ports is latched by the port control section 23. The data input to the input port A is sent to the area DATA 1, and similarly the data input to the input ports B, C and D is sent to the areas DATA 2, 3 and 4, respectively.

The port control section 23 detects a change in the parallel data input from the input port 21, and upon detecting a change in the input data, sets an input port variation flag. Further, when a change of the input data occurs, the port control section 23 checks a flag in the communication control section 26 indicating that the retransmission is in progress. Only when the data in the buffer memory is not being retransmitted, the port control section 23 transfers the new data to the transmission buffer memory 24 and supplies a send request to the communication control section 26. Further, the port control section 23 transfers the data stored in the reception buffer memory 25 by the communication control section 26 to the output port 22.

Upon receiving the send request, the communication control section 26 determines whether or not the multiplex bus 16 is in an idle state. When the multiplex bus 16 is not used by any of the multiplex nodes, the communication control section 26 transmits the data in the transmission buffer memory 24 to the other multiplex nodes through the multiplex bus 16. After the data transmission is completed, the communication control section 26 detects a dominant ACK confirmation bit on the multiplex bus 16 to be sent from each principal multiplex node having the ACK management function, and determines whether or not a retransmission of the data stored in the transmission buffer memory 24 is required, in accordance with the presence/absence of the ACK confirmation bit. When the data retransmission is not required, the communication control section 26 sets the retransmission flag off. Further, when receiving a frame of data, as shown in FIG. 6, via the multiplex bus 16, the communication control section 26 stores the received data in the reception buffer memory 25.

FIG. 9 shows the contents of a transmission frame transmitted from the communication control device. If the state of data input to the individual ports a–h of the input port A changes from "00000000" to "10000000", the port control section 23 has the data of all ports A, B, C and D latched and stored in the transmission buffer memory 24, and supplies a send request to the communication control section 26. While in a stand-by state for transmission because of use of the multiplex bus 16, if the data state of the input port A changes to "11000000" due to a change of data at the port b, the port control section 23 stores the new data "11000000" in the transmission buffer memory 24, whereby up-to-date data can be transmitted in one frame by the communication control section 26. In the case of using a plurality of kinds of transmission IDs, data with different transmission IDs can change, and in this case a plurality of transmission buffer memories must be provided for storing data before transmission. In this embodiment, since only one kind of transmission ID is used, a single transmission buffer memory is used in such a way that stand-by data is discarded and only new data is transmitted. whereby up-to-data data can be transmitted.

The data transmission carried out by the communication control device in FIG. 8 will be now described with reference to the flowcharts of FIGS. 10 to 12.

Figure 10:
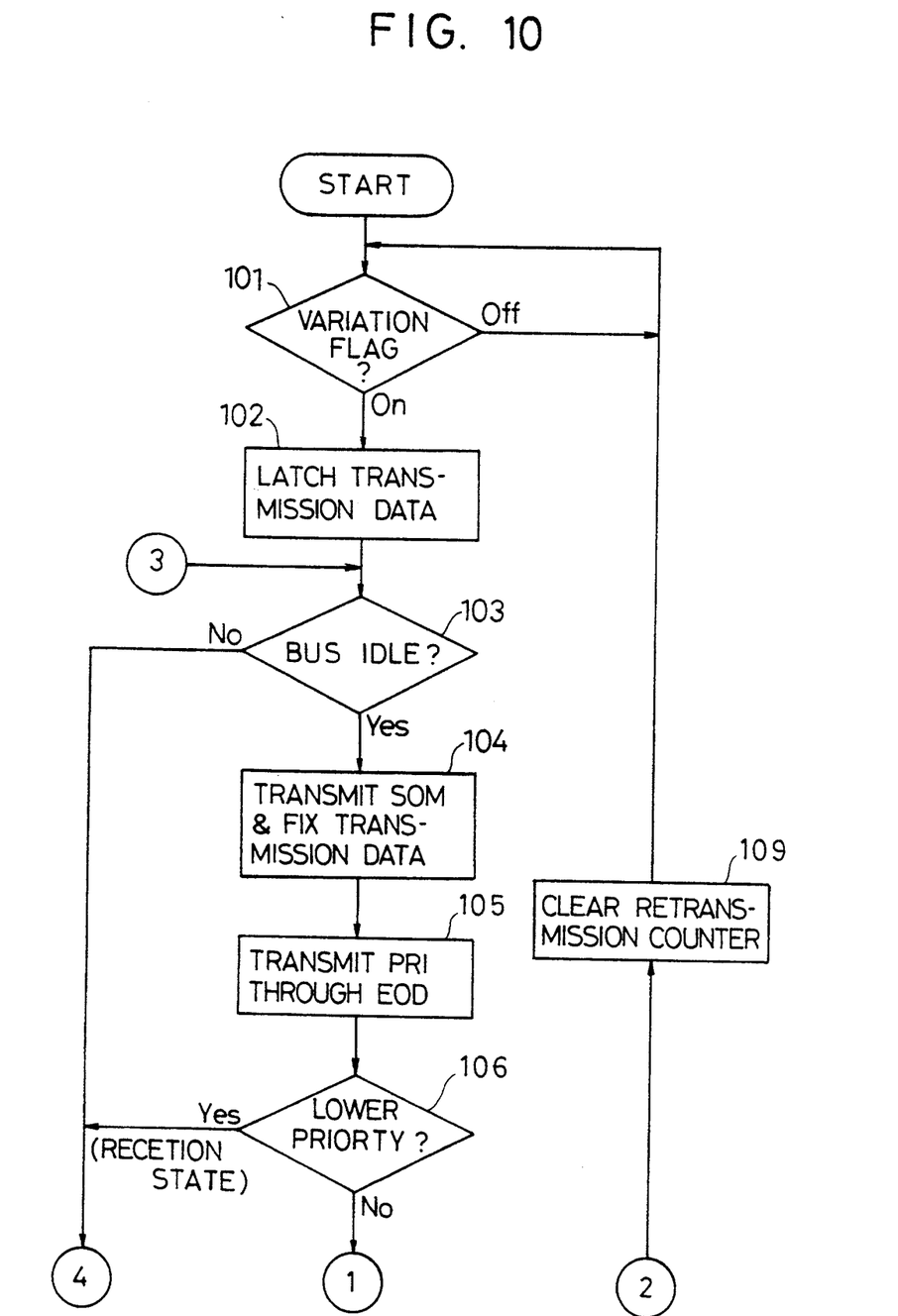
FIG. 10 is a flowchart showing a portion of a transmission operation executed by the communication control device in FIG. 8.

As shown in FIG. 10, the port control section 23 first determines whether or not the variation flag associated with the input port 21 is on (Step 101).

If the flag is off, then it means that the input data from the input port 21 has not changed, and therefore, the port control section 23 remains in a stand-by state until a change of input data occurs. If the flag is on, it indicates that the input data has changed, and in this case the port control section 23 latches the input data (parallel data) as the transmission data (Step 102). Then, the communication control section 26 determines whether or not the multiplex bus 16 Is in an Idle state (Step 103).

If the multiplex bus 16 is not used by any of the multiplex nodes and thus is idle, the port control section 23 stores the latched data in the transmission buffer memory 24 and outputs a send request to the communication control section 26. Upon receiving the send request, the communication control section 26 transmits the SOM of the transmission data in the transmission buffer memory 24 to the multiplex bus 16 to fix the transmission data (Step 104). Then, the communication control section 26 transmits the remaining data frame including PRI through END shown in FIG. 9 (Step 105), and determines whether or not the frame transmitted is lower in priority than any frame transmitted from another node (Step 106).

Figure 11:
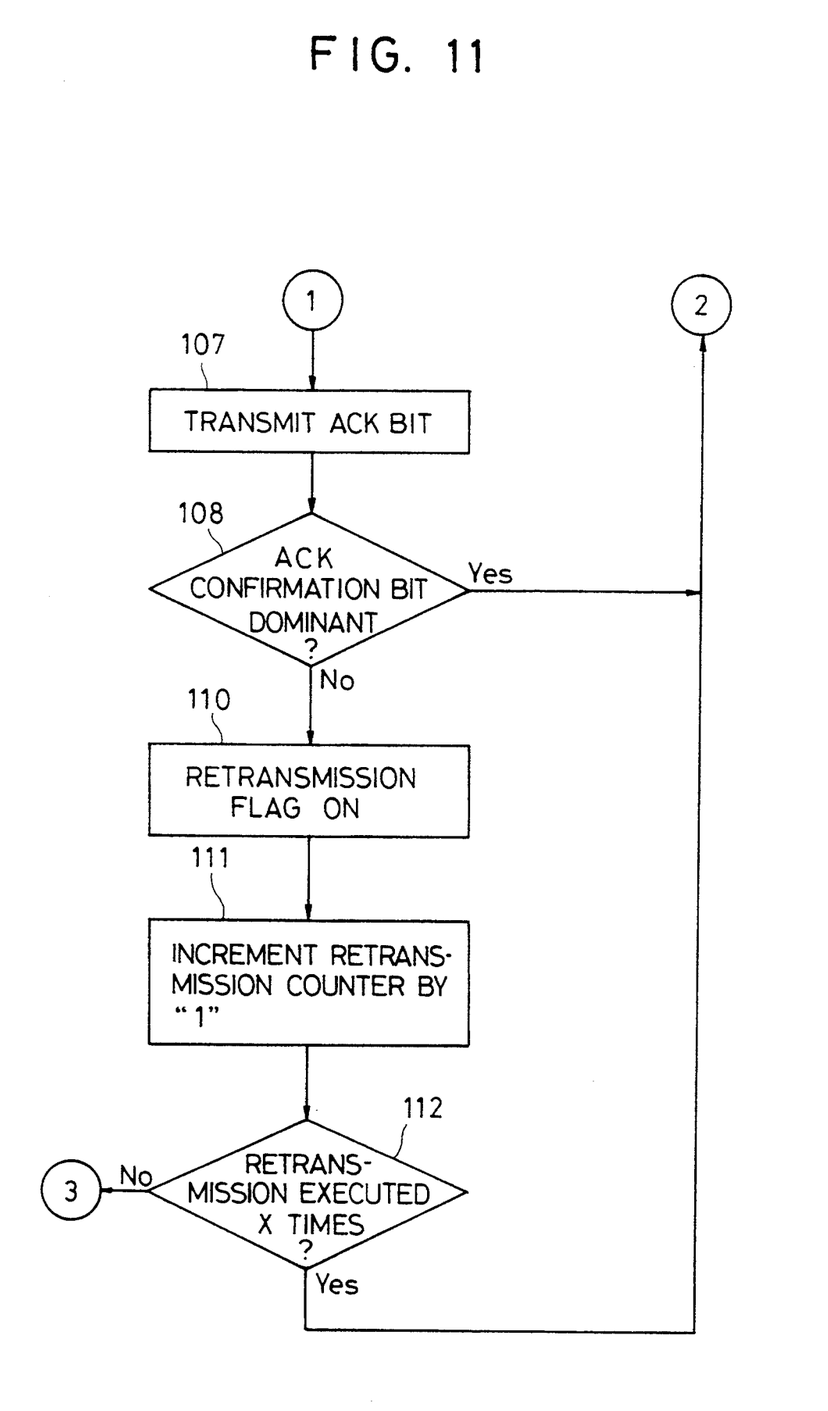
FIG. 11 is a flowchart showing another portion of the transmission operation executed by the communication control device in FIG. 8.

If the transmitted frame is preferential over the frames transmitted from other nodes, the communication control section 26 sends an ACK signal to the predetermined ACK area (Step 107), as shown in FIG. 11, after the transmission of the data frame. Then, the communication control section 26 determines whether or not the ACK confirmation area, in which the ACK confirmation bit supplied from the principal multiplex node including a CPU is stored, is dominant (Step 108).

If the ACK confirmation area is dominant, the communication control section 26 sets an internal flag, which indicates that the retransmission is in progress, to an off state, and at the same time clears the value of an internal retransmission counter which counts the number of times the retransmission is executed (Step 109). The program then returns to Step 101, in which the port control section 23 determines whether or not the input portion variation flag is on. If, on the other hand, the ACK confirmation area is passive, the communication control section 26 determines that a retransmission of the data is required, and thus sets the retransmission flag on (Step 110). The communication control circuit 26 then increments the value of the retransmission counter by one (Step 111), and determines whether or not the retransmission has been carried out X times (Step 112).

If the communication control section 26 determines that the transmission of the same data has been repeated X times, the program returns to Step 101, followed by the execution of processes similar to those described above. When the data transmission has not yet been repeated X times, the flow returns to Step 103, wherein the communication control section 26 determines whether or not the multiplex bus 16 is in an idle state. If the multiplex bus 16 is free, the communication control section 26 retransmits the data in the transmission buffer memory 24.

Although this embodiment has been explained with reference to the case in which each input/output node includes the retransmission counter, this counter may be omitted from each of the input/output nodes. In this case, the system may have a configuration such that each input/output node relies upon the ACK management counter contained in the principal node and whether or not the data retransmission is required is determined in accordance with the presence/absence of the ACK confirmation bit supplied from the principal node.

Figure 12:
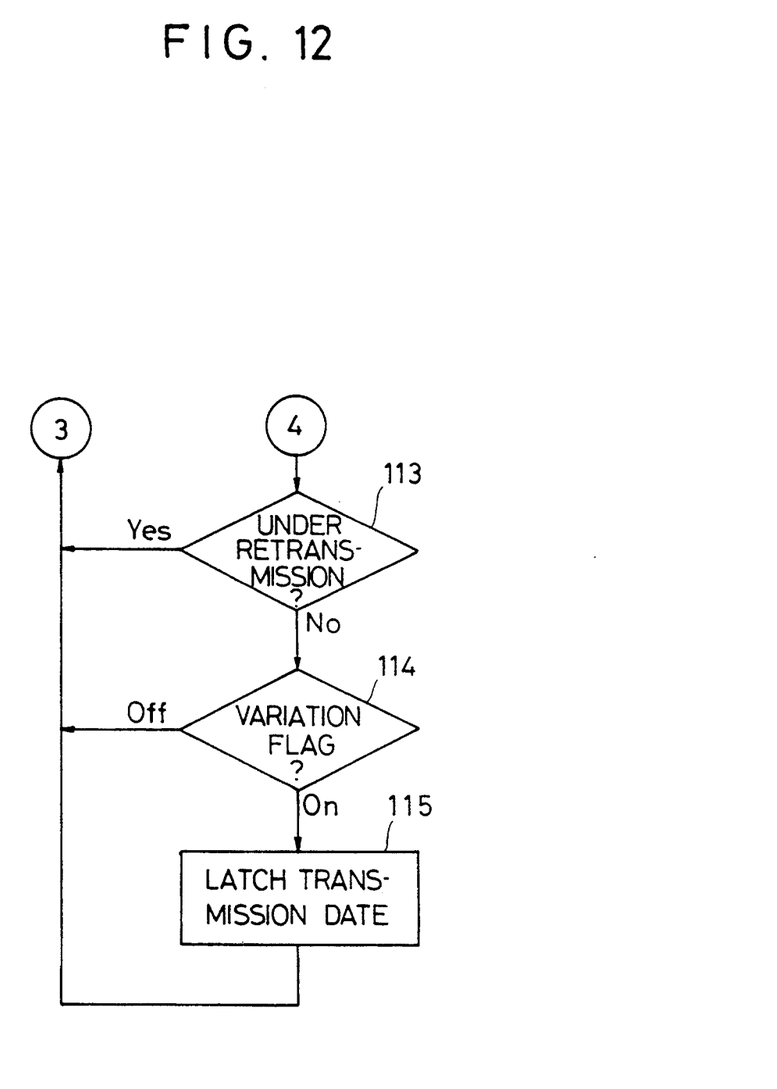
FIG. 12 is a flowchart showing the remaining portion of the transmission operation executed by the communication control device in FIG. 8.

If it is determined in Step 103 that the multiplex bus 16 is occupied, or if it is determined in Step 106 that the transmitted frame is less preferential (in this case the communication control device is set in a reception state), the port control section 23 determines whether or not the data in the transmission buffer memory 24 is being retransmitted by the communication control section 26 (Step 113), by checking the retransmission flag (FIG. 12). If this flag is off and thus the transmission data is not being retransmitted, or if the input port variation flag is on (Step 114), then it means that there has been a change in the transmission data (new transmission data has been input), and accordingly, the port control section 23 latches the new transmission data from the input port 21 (Step 115).

If it is determined in Step 113 that the retransmission flag is on and thus the transmission data is being retransmitted, or if it is determined in Step 114 that the input port variation flag is off, or if the transmission data is latched in Step 115, the program returns to Step 103 in which the communication control section 26 determines whether or not the multiplex bus 16 is in an idle state.

In the communication control device according to this invention, the port control section 23 determines whether or not up-to-date data from the input port 21 should be loaded into the transmission buffer memory 24, in accordance with the state of the retransmission flag. Only when the data previously stored in the transmission buffer memory 24 is being retransmitted, the loading of the up-to-date data into the transmission buffer memory 24 is prevented. After the retransmission is completed, the port control section 23 transfers the up-to-date data to the transmission buffer memory 24. If the data previously stored in the transmission buffer memory 24 has not yet been transmitted, the port control section 23 permits the up-to-date data to be loaded into the transmission buffer memory 24. Accordingly, it is possible to instantly transmit up-to-date data having greater importance.

This invention is not limited to the above-described embodiments, and it can be modified such that up-to-date data is allowed to be loaded into the transmission buffer memory 24 even during the retransmission, in the case wherein no inconveniences arise even if the data in a node that has successfully received a retransmitted message differs from that in another node that failed to receive the retransmitted message, or in the case wherein the up-to-date data has a top priority. In such a case, the multiplex transmission system may be constructed such that the operator can determine, by operating an external terminal, for example, whether the loading of up-to-date data, which occurred during the retransmission, into the transmission buffer memory 24 should be carried out or prevented, whereby the applicability of the system can be enhanced.

In the embodiment of FIG. 8, a data transmission is carried out using multiplex nodes having no CPU. However, this invention is not limited to such a configuration, and can be carried out using multiplex nodes each including a CPU.

What is claimed is:

1. A multiplex transmission system having a plurality of multiplex nodes interconnected by a common multiplex transmission line for transmitting a frame of data among the multiplex nodes through the multiplex transmission line, at least one multiplex node comprising:

transmission memory means, including a transmission buffer memory, for storing data to be inputted;

communication control means for transmitting/retransmitting said data stored in the transmission memory means to the multiplex transmission line; and port control means for checking a retransmission of data by the communication control means when a change of the data to be inputted is detected, and being responsive to a check result from said port control means for controlling said transmission memory means to stop storing said data having said change until a retransmission of the data is ended.

2. A multiplex transmission system according to claim 1, wherein at least one multiplex node determines whether or not to stop storing said data having a change to the transmission memory means until a retransmission of said data is ended.

3. A multiplex transmission system comprising a plurality of multiplex node means, interconnected by a common multiplex transmission line, for transmitting a frame of data among the plurality of multiplex node means through said multiplex transmission line, said plurality of multiplex node means including at least two multiplex node means for returning a respective acknowledge (ACK) transmission signal to said frame when said frame is received, said at least two multiplex node means including:

first multiplex node means having an ACK management function for:

making a judgment whether or not a retransmission of the frame is carried out in accordance with ACK signals returned from predetermined multiplex node means, in the case where a frame transmitted from another said plurality of multiplex node means is received and the received frame is addressed to a destination node means, generating an error check code in accordance with said frame, and transmitting said error check code to said frame, and second multiplex node means being without said ACK management function and forming said another said plurality of multiplex node means, for:

generating a second error check code in accordance with data transmitted from the destination node means, and making a comparison between said second error check code and the error check code generated by said first multiplex node means, so as to make a judgment whether or not a transmission of the data is normally carried out in accordance with a respective comparative result.

4. A multiplex transmission system comprising a plurality of multiplex node means, interconnected by a common multiplex transmission line, for transmitting a frame of data among the plurality of multiplex node means through said multiplex transmission line, said plurality of multiplex node means including at least two multiplex node means for returning a respective acknowledge (ACK) signal to said frame when said frame is received, said at least two multiplex node means including:

first multiplex node means having an ACK management function for:
  making a judgment whether or not a retransmission of the frame is carried out in accordance with ACK signals returned from predetermined multiplex node means, in the case where a frame transmitted from another said plurality of multiplex node means is received and the received frame is addressed to a destination node means,
  transmitting predetermined data to said frame, and
  generating an error check code in accordance with the data received from said first multiplex node means and said predetermined data from the destination node means, and
  transmitting said error check code to said frame, and second multiplex node means being without said ACK management function and forming said another said plurality of multiplex node means, for:
  generating a second error check code in accordance with data transmitted from the destination node means and the predetermined data transmitted from said first multiplex node means, and
  making a comparison between said second error check code and the error check code generated by said first multiplex node, so as to make a judgment whether or not a transmission of the data is normally carried out in accordance with a respective comparative result.

5. A multiplex transmission system comprising a plurality of multiplex node means, interconnected by a common multiplex transmission line, for transmitting a frame of data having an acknowledge (ACK) confirmation area, among the plurality of multiplex node means through said multiplex transmission line, said plurality of multiplex node means including at least two multiplex node means for returning a respective acknowledge (ACK) signal to said frame when said frame is received, said at least two multiplex node means including:

first multiplex node means having an ACK management function for:
  making a judgment whether or not a retransmission of the frame is carried out in accordance with ACK signals returned from predetermined multiplex node means, and
  transmitting an ACK confirmation signal to said ACK confirmation area in accordance with a respective judgment result, and second multiplex node means being without said ACK management function, for making a judgment whether or not a transmission of the data is normally carried out in accordance with the presence of the ACK confirmation signal from said first multiplex node means.

* * * * *